June 11, 1946.   K. H. WILCOXON   2,401,783
CABLE FAIRING AND DEVICE FOR APPLYING AND REMOVING THE SAME
Filed May 1, 1943   2 Sheets-Sheet 2

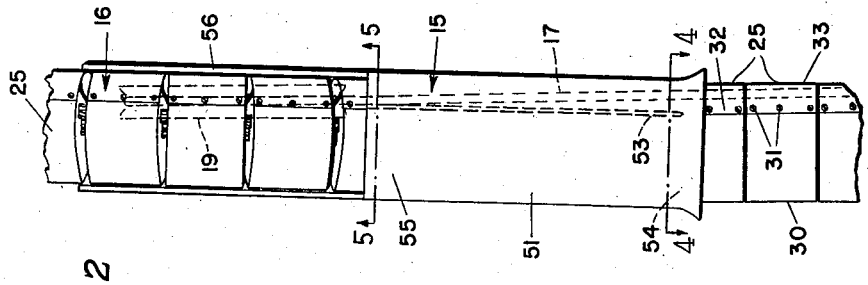
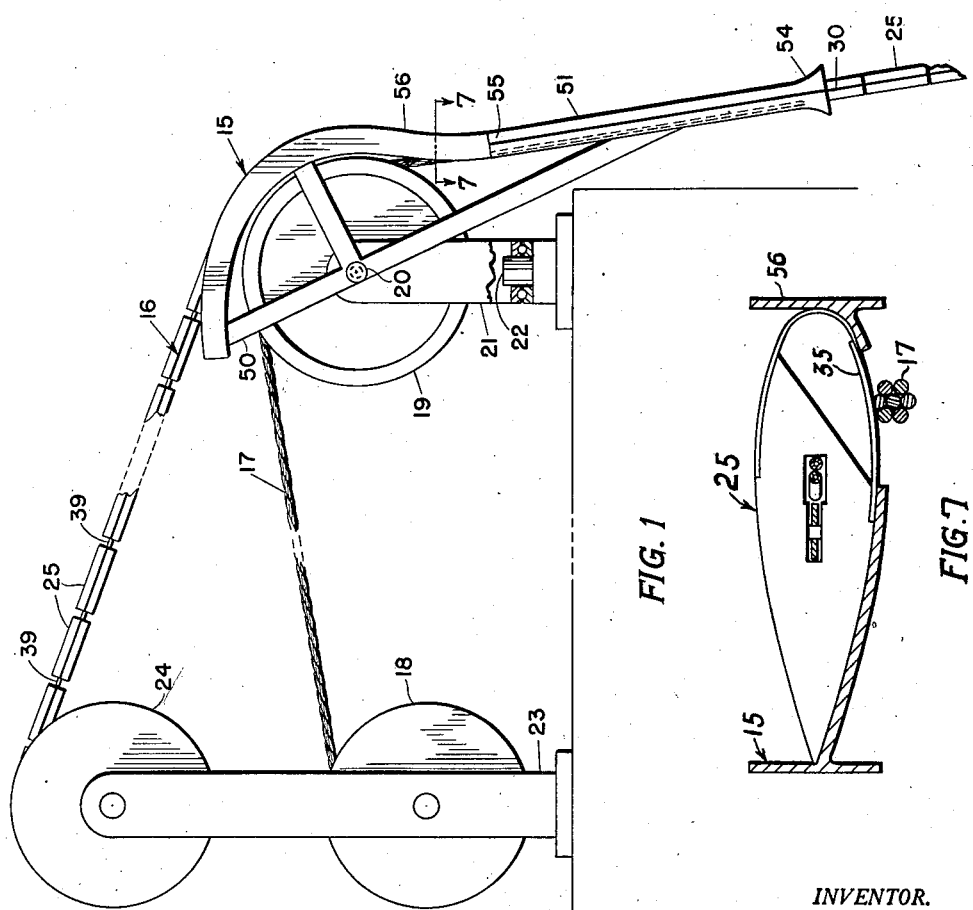

INVENTOR.
KENNETH H. WILCOXON
BY
HIS ATTORNEY

Patented June 11, 1946

2,401,783

UNITED STATES PATENT OFFICE 2,401,783

CABLE FAIRING AND DEVICE FOR APPLYING AND REMOVING THE SAME

Kenneth H. Wilcoxon, Cabin John, Md.

Application May 1, 1943, Serial No. 485,453

10 Claims. (Cl. 114—235)

(Granted under the act of March 3, 1883, as amended April 30, 1928; 370 O. G. 757)

The invention relates to improvements in cable fairing and to equipment for applying and removing the cable fairing.

In operations such as minesweeping, the underwater cables employed are faired to facilitate travel of the cables through the water, to reduce vibration in the cables, and to provide for the carrying of electric conductors, air hose or the like to a paravane and/or other towed objects. The usual fairing is attached to the cable in a manner whereby it is not readily removable so that it is necessary, when reeling the cable in, to stow the cable with the fairing attached. When the fairing is in continuous lengths, a special and bulky winding drum is required because one layer of fairing cannot be wound on top of another.

An important object of the present invention is to provide a fairing that can be applied or removed as the cable is paid out or reeled in and which can be wound on a separate drum.

Another object of the invention is to provide a series of relatively short fairing units with lost motion connections between adjacent units of the series.

A further object of the invention is the provision of a device for putting the fairing on the cable as it is paid out, and for removing the fairing as the cable is hauled in.

A still further object is to provide a device of the character described which is so supported that it will follow any angle the cable may take relative to a ship.

The invention also aims to provide cable fairing apparatus which will allow the cable to be wound on a cable drum under full tension.

Other objects and advantages of the invention will become apparent during the course of the following detailed description, taken in connection with the accompanying drawings, forming a part of this specification, and in which drawings, Figure 1 is an end elevational view showing the cable fairing device and the drums for reeling in and paying out the cable and fairing.

Figure 2 is a side elevational view of the cable fairing device.

Figure 3:
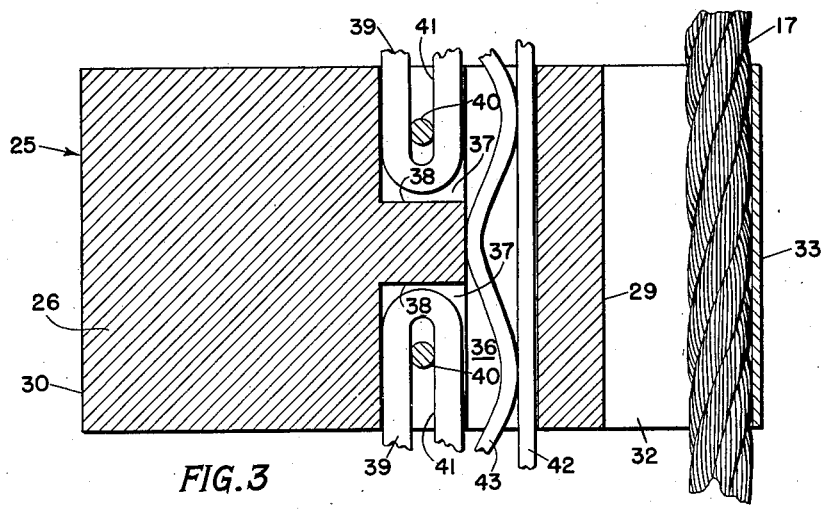
Figure 3 is a central longitudinal sectional view of a cable fairing unit carrying an electrical conductor and air hose.
Figure 4:
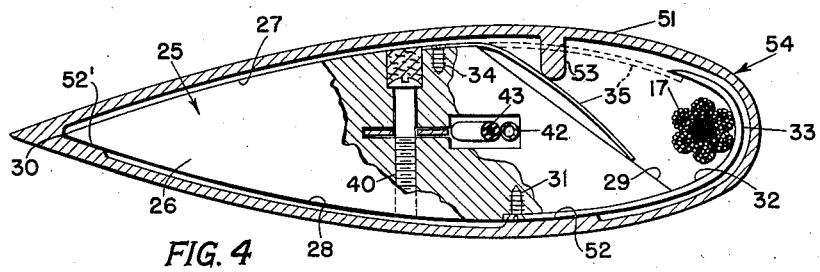
Figure 5:
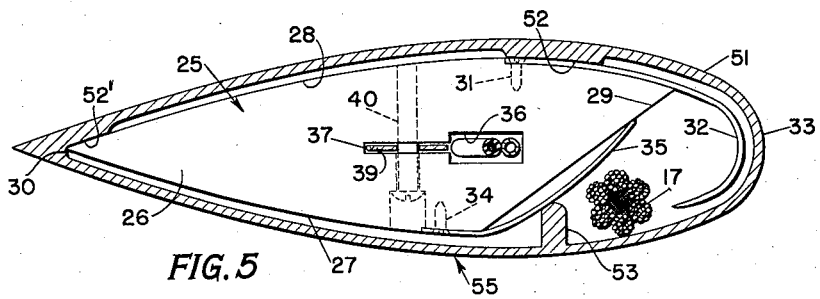

Figures 4 and 5 are transverse sectional views taken substantially on the lines 4—4 and 5—5 respectively of Figure 2.

Figure 6:
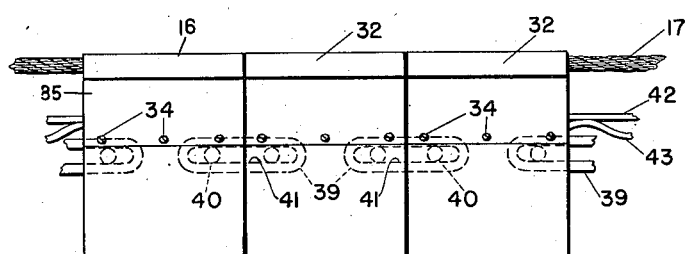

Figure 6 is a plan view of a section of the faired cable looking toward the side opposite that shown in Figure 2.

Figure 7 is a transverse sectional view taken substantially on the line 7—7 of Figure 1.

In the drawings, which for the purpose of illustration show only a preferred form of the invention, and wherein similar reference characters denote corresponding parts throughout the several views, the numeral 15 generally designates the device for putting on and removing the fairing 16 from the cable 17.

As shown in Figure 1, the cable 17 is led from a cable drum 18 over a pulley wheel 19 that is mounted for rotation about a normally horizontal shaft 20 carried by a bracket 21 mounted for swinging movement about a normally vertical pivot 22. The standard 23 which carries the cable drum 18 may also serve to support a cable fairing drum 24 thereabove.

Referring now to the cable fairing 16, the same comprises a series of relatively short fairing units 25, each including a main body portion 26 of any suitable materials, such as wood. The main body portion 26 of each unit 25 includes short and long sides 27, 28 and tapers from its oblique forward end 29 to its trailing edge 30. Fixed to the long side 28, as by screws 31, is a forwardly extending curved wall 32 forming a hook adapted to engage the cable 17 and also providing a streamline surface at the leading end 33 of the unit. Fixed to the short side 27, as by screws 34, is a forwardly extending resilient metal sheet constituting a spring latch 35 forming a streamline surface between the short side 27 and the hook wall 32. Extending transversely through the main body portion 26 of each fairing unit is a passageway 36 for carrying electric conductors, air hose and the like. Extending inwardly of opposite sides of the units are pockets 37 which may communicate laterally with the passageway 36 and which terminate at their inner ends in abutment surfaces 38. The adjacent fairing units are loosely and flexibly articulated, as by extending the opposite end portions of elongate slotted links 39, of resilient sheet metal, into the pockets of adjacent units, and securing the links 39 therein as by transverse screws 40. The pockets 37 are made of a depth at least equal to one half the length of the links 39 so that adjacent fairing units may abut one another, and the screws 40 are spaced from the ends of the elongate slots 41 so as to provide lost-motion connections between adjacent fairing units. In the example shown, an air hose 42 and an electric conductor 43 are shown in the passageway 36, the conductor 43 being of special undulating formation so that it may expand and contract longitudinally and transversely upon the occcurrence of relative movement between adjacent fairing units.

Referring now to the cable fairing device 15, shown more particularly in Figures 1, 2, 4 and 5, this device is mounted for swinging movement about the axis of rotation of the pulley wheel 19, as by a bracket 50 on the pulley shaft 20. Supported by the bracket 50 slightly out of tangential alignment with the groove of the pulley wheel 19 is a cam sleeve 51 provided with interior longitudinal guide tracks 52, 52' slidably engaging the cable fairing 16 and with a cam strip 53 extending substantially throughout the length of the sleeve 51. This cam strip 53 is adapted to slidably engage and depress the spring latches 35 of those fairing units 25 within the cam sleeve 51. In order to facilitate the entrance of the cable fairing 16 into the cam sleeve 51, the end 54 thereof remote from the pulley wheel may be flared. At its opposite end 55, the cam sleeve 51 is connected to an arcuate channel-shaped guideway 56 disposed in spaced relation beyond the rim of the pulley wheel 19. This guideway 56 directs the articulated cable fairing 16 into and out of engagement with the cable 17 in the vicinity of the juncture of the guideway and the cam sleeve 51. The guideway is so supported by the bracket 50 as to define with the sleeve 51 a curved path extending partially around the rim of the pulley and which path lies in a plane which is out of parallelism with the plane of the pulley 19 and cable 17, as shown by broken lines in Figure 2. The cable 17 is disposed in skew relation to the longitudinal axis of the cam sleeve. In traveling longitudinally through the sleeve 51, any given section of the cable moves not only in the direction of the length of the sleeve but also in the directions of its width and of its thickness. As shown in Figure 4, that portion of the cable 17 at one end 54 of the cam sleeve 51 lies forwardly and centrally of the fairing unit 25 and is engaged by the hook 32. At the opposite end 55 of the cam sleeve, the cable 17 is laterally and rearwardly displaced relative to the hook, as shown in Figure 5.

In the use of the fairing device 15 in operations such as minesweeping, when the cable 17 is paid out from the drum 18, the articulated fairing 16 is drawn through the cam sleeve 51, due to the pull exerted on the faired cable by the paravane or other object being towed. The outermost fairing unit is of course attached to the paravane or other towed object, or to the end of the cable at its point of attachment to the towed object.

As the fairing units 25 enter the sleeve 51, the cam strip 53 depresses the spring latches 35 thereof and, due to the angle between the sleeve 51 and the cable, the articulated units 25 are successively brought into faired relation to the cable as they move toward the remote end 54 of the sleeve.

When the cable 17 is reeled in, the operation of the fairing device 15 is the reverse of that just described. As the faired cable enters the sleeve 51 at its end 54, the cam strip 53 successively releases the spring latches 35 of the individual fairing units 25 which are then separated from the cable 17 due to the skew relation of the cable 17 within the fairing guide sleeve 51. Because of the tension on the cable 17 as it is being reeled in, the articulated fairing units 25 are of course drawn into abutment with one another between the towed object and the guide sleeve 51, as shown in Figures 1 and 2, each fairing unit being pushed through the sleeve by the units between it and the towed object.

Those changes in the angular relationship between the cable and ship which normally occur in operations such as minesweeping will be permitted by the pivotal mounting of the cable fairing device 15 on the pulley shaft 20 and the pivotal mounting of the pulley bracket 21 on the member 22.

Various changes may be made in the form of invention herein shown and described without departing from the spirit of the invention or the scope of the following claims.

This invention may be manufactured and/or used by or for the Government of the United States of America for governmental purposes without the payment of any royalty thereon or therefor.

I claim:

1. A cable fairing comprising a series of articulated fairing units and spring latch means for releasably securing the individual units in fairing relation to a cable.

2. A cable fairing comprising a series of fairing units, lost motion connections between adjacent units of said series, and spring latch means for releasably securing the individual units in fairing relation to a cable.

3. A cable fairing unit comprising a main body portion provided at one side with a forwardly extending curved wall forming a cable-engaging hook and providing a streamline surface at the leading end of the fairing unit, and a spring latch normally preventing engagement or disengagement of the hook and cable and providing a streamline surface between the opposite side of the main body portion and the hook.

4. A cable fairing unit comprising a main body portion having an oblique forward end, a long side and a short side, a curved wall extending forwardly of the long side to form a cable-engaging hook and providing a streamline surface at the leading end of the unit, the short side of said main body portion being provided with a latch controlling access to the hook and forming a streamline surface between the short side of the body and the hook.

5. In equipment for applying to and removing from a cable a series of articulated fairing units provided with latches normally preventing the application or removal of the fairing units, a cable drum, a fairing drum, a pulley carrying the cable from the cable drum, and a device mounted for swinging movement about the axis of rotation of the pulley, said device including a member slidably engaging the faired cable and provided with means releasing said latches.

6. In equipment for applying to and removing from a cable a series of articulated fairing units provided with latches normally preventing the application or removal of the fairing units, means for releasing the latches of said units in a zone along the path of travel of the cable, and means for guiding the articulated fairing units into or out of fairing relation to the cable within said zone depending on the direction of travel of the cable.

7. In equipment for applying to and removing from a cable a series of articulated fairing units provided with latches normally preventing connection or release of the fairing units, a pulley supporting the cable, a bracket supporting the pulley for rotation about its axis, means supporting the bracket for rotation about an axis normal to the axis of said pulley, and a device mounted for swinging movement about the axis of said pulley, said device opening the latches of said fairing units in a zone along the path of travel of the cable and directing said fairing units into or out of fairing relation to the cable as the cable is paid out or drawn in.

8. In equipment for applying to and removing from a cable a series of articulated fairing units provided with latches normally preventing the application or removal of the fairing units, a cable drum, a fairing drum, a pulley carrying the cable from the cable drum, a device mounted for swinging movement about the axis of rotation of the pulley, said device including a sleeve member slidably engaging the faired cable and provided with means releasing said latches, and an arcuate trough-like guide extracircumferentially of the pulley for guiding the cable fairing into and out of the sleeve member.

9. The combination with equipment for drawing in and paying out both a cable and a fairing for the cable, said fairing comprising a series of articulated fairing units and latches for releasably securing the individual units in fairing relation to the cable, of a device coacting with said latches and automatically successively disposing said units in and out of fairing relation to said cable upon paying out and drawing in, respectively, of said cable and fairing.

10. The combination with equipment for drawing in and paying out both a cable and a fairing for the cable, said fairing provided with latch means releasably securing the fairing on the cable, of a device coacting with said latch means as the cable and fairing are paid out or drawn in and automatically disposing successive portions of said fairing in or out of faired relation to the cable.

KENNETH H. WILCOXON.